(12) United States Patent
Mueller

(10) Patent No.: US 9,016,918 B2
(45) Date of Patent: Apr. 28, 2015

(54) LIGHTING DEVICE

(75) Inventor: Wolfgang Mueller, Wermelskirchen (DE)

(73) Assignee: Johnson Controls Technology Company, Holland, MI (US)

( * ) Notice: Subject to any disclaimer, the term of this patent is extended or adjusted under 35 U.S.C. 154(b) by 198 days.

(21) Appl. No.: 13/262,812

(22) PCT Filed: Mar. 30, 2010

(86) PCT No.: PCT/EP2010/001993
§ 371 (c)(1),
(2), (4) Date: Feb. 15, 2012

(87) PCT Pub. No.: WO2010/112191
PCT Pub. Date: Oct. 7, 2010

(65) Prior Publication Data
US 2012/0134173 A1   May 31, 2012

(30) Foreign Application Priority Data

Apr. 3, 2009 (DE) .......................... 10 2009 016 098
Nov. 26, 2009 (DE) .......................... 10 2009 055 733

(51) Int. Cl.
*F21V 7/04* (2006.01)
*B60Q 3/00* (2006.01)
*B60Q 3/02* (2006.01)
*F21V 8/00* (2006.01)
*B60Q 1/26* (2006.01)

(52) U.S. Cl.
CPC .............. *B60Q 3/004* (2013.01); *B60Q 3/0283* (2013.01); *G02B 6/0021* (2013.01); *G02B 6/0073* (2013.01); *G02B 6/0095* (2013.01); *B60Q 1/263* (2013.01)

(58) Field of Classification Search
None
See application file for complete search history.

(56) References Cited

U.S. PATENT DOCUMENTS

| 5,590,945 A * | 1/1997 | Simms .......................... 362/623 |
| 2003/0123262 A1* | 7/2003 | Suehiro et al. ................ 362/555 |
| 2003/0169997 A1 | 9/2003 | Hulse et al. |
| 2005/0007759 A1 | 1/2005 | Parker |
| 2005/0270794 A1 | 12/2005 | Okamoto et al. |
| 2007/0159854 A1 | 7/2007 | Kokubu et al. |

FOREIGN PATENT DOCUMENTS

| DE | 2310715 A1 | 9/1974 |
| DE | 10123263 A1 | 11/2002 |
| DE | 10313068 | 12/2004 |
| DE | 10332393 | 2/2005 |
| DE | 10341409 A1 | 4/2005 |
| DE | 102004051315 A1 | 4/2006 |

(Continued)

OTHER PUBLICATIONS

German Examination Report mailed May 11, 2012.

(Continued)

*Primary Examiner* — Mary Ellen Bowman
(74) *Attorney, Agent, or Firm* — Fletcher Yoder, P.C.

(57) ABSTRACT

A lighting device is disclosed that is configured for mounting in or on a motor vehicle. The lighting device comprises a light guiding element and a light source. The light guiding element has a light entry face and a light exit face. A depth of the lighting device perpendicular to the light exit face corresponds essentially fully to the depth of the light guiding element.

18 Claims, 2 Drawing Sheets

(56) References Cited

FOREIGN PATENT DOCUMENTS

Figure 2:
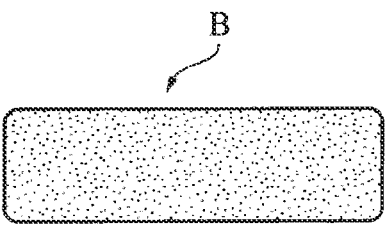

| | | |
|---|---|---|
| DE | 202006003757 U1 | 7/2006 |
| DE | 102005024838 A1 | 11/2006 |
| DE | 102005037320 B3 | 12/2006 |
| DE | 102006041239 A1 | 3/2008 |
| FR | 2877896 | 5/2006 |
| FR | 2877896 A1 | 5/2006 |
| FR | 2895780 A1 | 7/2007 |
| FR | 2920717 A1 | 3/2009 |
| GB | 2429747 | 3/2007 |
| JP | 2002100213 | 4/2002 |
| WO | 2005028251 A1 | 3/2005 |

OTHER PUBLICATIONS

International Search Report of PCT Application No. PCT/EP2010/001993 mailed Jun. 25, 2010.

German Examination Report; pp. 1-2, Jun. 2, 2010.

* cited by examiner

LIGHTING DEVICE

CROSS REFERENCE TO RELATED APPLICATIONS

This application claims priority from and the benefit of PCT Application No. PCT/EP2010/001993, filed on Mar. 30, 2010; German Patent No. DE 10 2009 016 098.1, filed on Apr. 3, 2009; and German Patent DE 10 2009 055 733.4, filed on Nov. 26, 2009; all entitled "LIGHTING DEVICE", which are herein incorporated by reference.

BACKGROUND

The invention relates to a lighting device, particularly a lamp, particularly for installation in or on a motor vehicle.

In automobile construction, lamps are often used for different series from the same manufacturer and meet different functional requirements, for example when used as a cosmetic mirror or for illuminating storage compartments or a footwell in the vehicle.

Individual examples of such lamps are known from the documents DE 10 2005 037 320 B3, DE 20 2006 003 757 U1 and DE 10 2005 024 838 A1.

It has been found to be disadvantageous in practice that the structure for holding a known lamp needs to have a comparatively large physical depth of several centimeters and, furthermore, the removal of the heat produced by the lamp requires extensive refinement of the structure, which takes up further installation space. As a measure for adaptation to suit the reduced installation space, it has been customary to date to reduce the usable depth of other vehicle components arranged adjacent to the lamp, such as map cases.

A further drawback of the prior art is that appropriate mechanisms need to be provided which allow replacement of the light source for the lamp, for example an incandescent lamp.

The object of the invention is thus to propose remedial measures for the problem described above.

The object is achieved by a lighting device having a light guiding element and a light source for mounting in or on a motor vehicle, wherein the light guiding element has a light entry face, wherein the light guiding element has a light exit face, and wherein the depth of the lighting device perpendicular to the light exit face corresponds essentially fully to the depth of the light guiding element. This allows the lighting device to be designed to be particularly shallow (i.e. of little physical depth), since only the depth of the light guiding element is provided as the depth of the entire lighting device. Further installation space—for example for a further housing or a light bulb holder or the like—is not required.

SUMMARY

One important feature of the invention is that for different fields of application, a few of which have been cited by way of example above, a light emitting diode LED is used as a light source which is preferably of physically shallow design. In the text which follows, the term "light emitting diode" (or LED) and the term "light source" are therefore used largely synonymously.

A further important feature of the invention is that the lighting device has the light guiding element as a carrier. An example of a suitable carrier or light guiding element is a carrier which interacts with the LED, is completely or partially transparent and is designed and/or in a physical arrangement relative to the light source such that the light produced by the LED is guided in a defined direction (or a defined angular range of 30° aperture or else 45° aperture, for example) by the carrier (or the light guiding element) and is emitted (particularly for the purpose of illuminating a particular region of the lighting device which needs to be lit). According to the invention, it is particularly preferred in this context for the light guiding element to be a light guiding body or for the light guiding element to have a reflector. If the light guiding element is a light guiding body, the light is guided essentially over its entire path by the material of the light guiding element. If the light guiding element has a reflector, the light is not guided over its entire path by the material of the light guiding element but rather is guided by a (liquid-filled, gas-filled or else (at least partially) evacuated) interior, for example.

In one refinement of the invention, the carrier or the light guiding element is produced partially or completely from plastic.

In accordance with one embodiment of the invention, the LED is embedded on a rigid or flexible conductor in a manner which is known per se—when considered on its own—and is integrated in or connected to the carrier (or light guiding element).

In accordance with another embodiment of the invention, the LED is insert molded directly during the production or design of the plastic carrier (or light guiding element).

According to the invention, such measures result in the opportunity to give the lighting device according to the invention a particularly physically shallow design, i.e. to design the extent of the lighting device in a direction perpendicular to the light exit face to be as small as possible.

According to the invention, the lighting device according to the invention is preferably of such physically shallow design that the depth of the lighting device perpendicular to the light exit face is less than 10 mm, preferably less than 8 mm, particularly preferably less than 5 mm. This has the great advantage that the lighting device can be of very space-saving design and hence is universally usable (for example in vehicle construction).

The fastening for the lighting device according to the invention can be used, particularly at the same time, as a cable pushing.

According to the invention, the implementation of the light guiding element as a carrier allows all the colors of the light produced by the lighting device according to the invention to be shown.

According to the invention, it is particularly preferred for the light entry face to be provided essentially perpendicular to the light exit face. According to the invention, this advantageously allows the lighting device to be of shallow design because the light source can be positioned on the light guiding element at the side and it is possible to avoid arranging the light source on that side (back) of the light guiding element which is averted from the light exit face (of the lighting device), which further reduces the possible physical depth which can be attained. In order to implement such lateral connection of the light source, it also preferred for the lighting device to have a back and also lateral faces averted from the light exit face, wherein the lighting device also has electrical connection means for electrical connection of the lighting device in the region of the lateral faces.

It is also preferred, according to the invention, for the light guiding element to have a connecting element for mounting the lighting device. By way of example, such a connecting element is a connecting clip or a plurality of connecting clips which is/are used for clipping the lighting device on a motor vehicle component, for example a roof liner or a sun visor or a storage compartment or a license plate lighting holder. In particular, such a motor vehicle component has a recess or an opening such that the lighting device can be put through the opening and fastened by means of the connecting element.

For the purpose of advantageously implementing particularly good uniform light distribution in the region of the light exit face, the lighting device preferably has at least one angular face on the back. By way of example, an appropriate material design for the light guide and particularly appropriate patterning on the back of the light guide allow the implementation of light exit, adapted to suit the lighting requirements, from the light exit face, for example by virtue of prism-like structural elements on the back of the light guiding element or the like.

DRAWINGS

Figure 1:
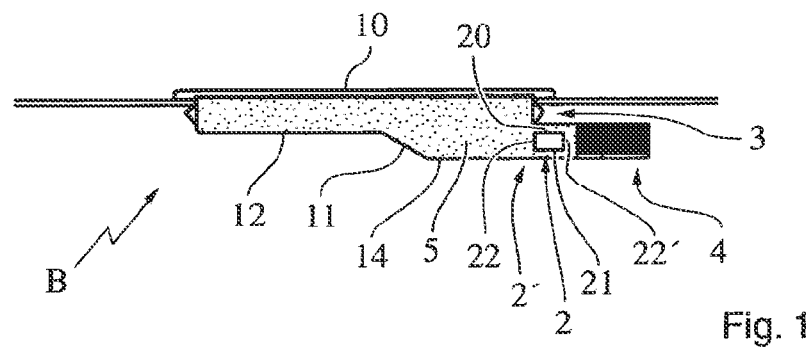
Figure 3:
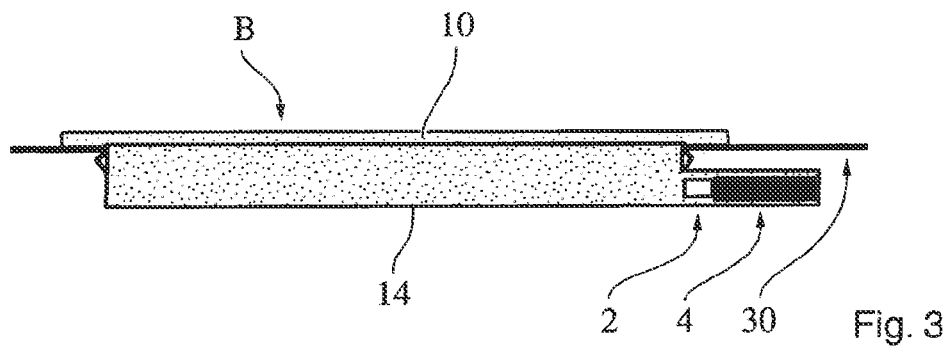
Figure 4:
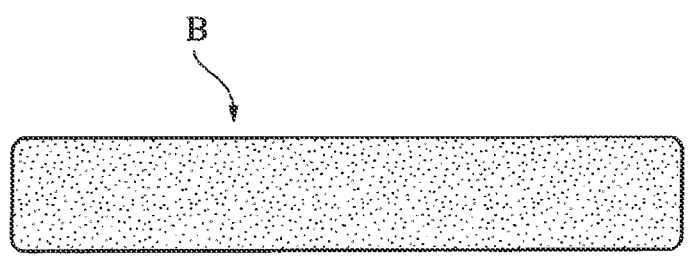
Figure 5:
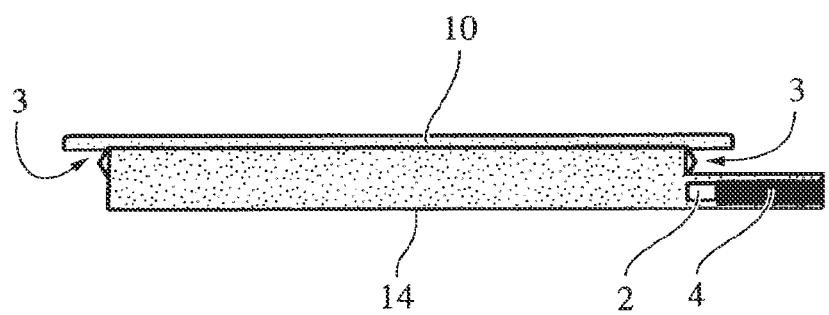

An embodiment of the invention which should be regarded as purely exemplary is described in a little more detail below with reference to the appended drawings, in which:

FIG. 1 shows a section through a lighting device designed according to the invention, in a schematic illustration, FIG. 2 shows a plan view of a plastic carrier as a light guiding element in the lighting device designed according to the invention, FIGS. 3 and 5 show a section through a lighting device designed according to the invention based on one variant, in a schematic illustration, FIG. 4 shows a plan view of a plastic carrier as a light guiding element in the lighting device designed according to the invention based on the variant shown in FIG. 3, FIGS. 6 to 10 show sections through lighting devices designed according to the invention in a schematic illustration based on further variants of the present invention.

DETAILED DESCRIPTION

The lighting device B designed according to the invention which is shown in a schematic sectional illustration in FIGS. 1, 3 and 5 comprises a plastic carrier 1 (or a light guiding element 1) and a light source 2, particularly in the form of an LED 2 injection molded into the plastic carrier 1. Situated in physical proximity to the LED 2 are a plurality of connecting clips 3, arranged above the LED 2, as connecting element 3 (or a plurality of connecting elements 3). In addition, an integrated connector 4 arranged at the side of the LED 2 is visible as connection means 4 (referred to in English literature as an "integrated connector").

Both in the embodiment shown in FIG. 1 and on the basis of the variant shown in FIG. 3 or 5, the plastic carrier 1 (or the light guiding element 1) is designed and in a relative physical arrangement, particularly in the region of its back and relative to the LED 2, such that the light produced by the LED 2 is guided through the plastic carrier 1 or the light guiding element 1 upwards in the direction of a (light) exit face 10 which bounds the plastic carrier 1 at the top. In particular, provision is made, for example using at least one prism and/or at least one lens, for the light to exit the plastic carrier 1 or light guiding element 1 from the exit face 10 in scattered fashion.

In accordance with the variant embodiment shown in FIG. 1, the plastic carrier 1 is provided with a rib structure 5 in the example, particularly in the region of its back.

In accordance with the variant embodiment shown in FIGS. 3 and 5, the plastic carrier 1 is provided from transparent material, for example, which has a plurality of microscatter centers embedded in it. These scatter centers are distributed throughout the material and cater for the decoupling of the light. Special further measures are not required in this variant embodiment. This avoids the construction complexity and at the same time increases the design freedom.

Both in accordance with the variant embodiment shown in FIG. 1 and in accordance with that shown in FIGS. 3 and 5, the LED 2 or light source 2 is bounded at the top by a first upper face 20 and at the bottom by a first lower face 21, the latter being arranged parallel both to the upper face 20 and to the (light) exit face 10. Two lateral faces 22, 22' which are arranged parallel to one another and at right angles to the lower face 21 or upper face 20 bound the LED 2 on both sides. The LED 2 has a thickness which is less than 10 mm, which means that the LED 2 is of particularly shallow design. In accordance with the invention, the light produced by the light source 2 or the LED 2 enters the light guiding element 1 particularly from one of the lateral faces 22, 22'. A face of the light guiding element 1 which is opposite one of these lateral faces 22, 22', particularly the face which is opposite that lateral face 22 which points toward the main region of the light guiding element 1, is therefore also referred to as a light entry face 2' (into the light guiding element 1).

The plastic carrier 1 has a second lower face 14 (or back) arranged parallel to the exit face 10. In the variant embodiment shown in FIG. 1, a slanted angular face 11 extends from the second lower face 14 to a step face 12, which is likewise arranged parallel to the exit face 10. The figure shows an exemplary embodiment in which the angular face 11 makes up less than half the extent of the light guiding element 1, and the second lower face 14 together with the step face 12 make up more than half of this extent. According to the invention, a further variant may also have provision for the step face 12 to comprise more than half this extent (and then to have a shallower profile) and for the second lower face 14 together with the step face 12 to make up less than half this extent. In accordance with the variant embodiment shown in FIGS. 3 and 5, the second lower face 14 (or back) is produced without an angular face 11 or step and without an offset step face 12. On the contrary, in a variant shown in FIGS. 3 and 5, the second lower face 14 extends more or less over the entire front or light-emitting exit face 10 of the light guiding element 1.

The distance between the second lower face 14 and the exit face 10 is approximately 5 mm, for example.

FIGS. 2 and 4 each show a plan view of the plastic carrier 1, which has a length of 60 mm and a width of 25 mm, for example.

Along the perimeter of the light guiding element 1, the light guiding element 1 is connected (both in accordance with the variant shown in FIGS. 1 and 2 and as shown in FIGS. 3, 4 and 5) to a motor vehicle component, particularly an interior component 30, particularly by means of the connecting element 3 or the plurality of connecting elements 3. To this end, the front of the light guiding element 1 has (along the periphery of the light guiding element 1) an overhang which conceals or covers the connecting region relative to the interior component 30 or relative to the motor vehicle component. The material thickness of this overhang perpendicular to the exit face 10 is 1.5 mm, for example.

Figure 6:
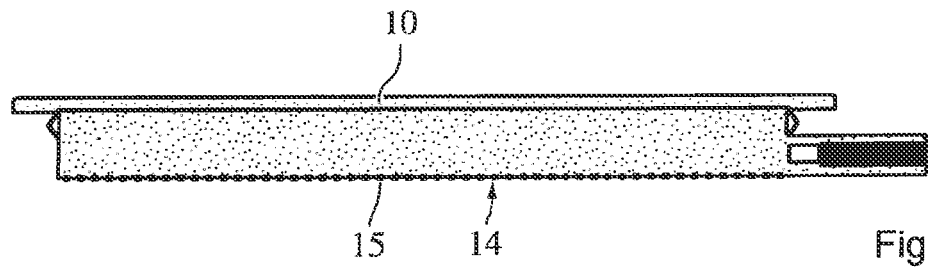

FIGS. 6 to 10 show sections through lighting devices B designed according to the invention in a schematic illustration based on further variants of the present invention. In this context, FIG. 6 shows a variant of the lighting device B in which the decoupling of light (particularly on the back or on the second lower face 14) is produced by means of rough patterning 15 of the second lower face 14 or of the light guiding element 1 in the region of the second lower face 14. In this case, the light guiding element 1 is provided particularly as a transparent light guide.

Figure 7:
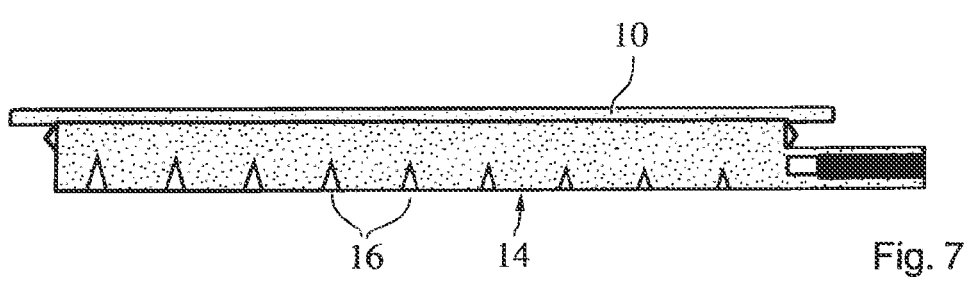

FIG. 7 shows a variant of the lighting device B in which the decoupling of light (particularly on the back or on the second lower face 14) is produced by means of a geometric structure 16 at the second lower face 14 or of the light guiding element 1 in the region of the second lower face 14, particularly in the form of prisms. In this case, the light guiding element 1 is provided particularly as a transparent light guide.

Figure 8:
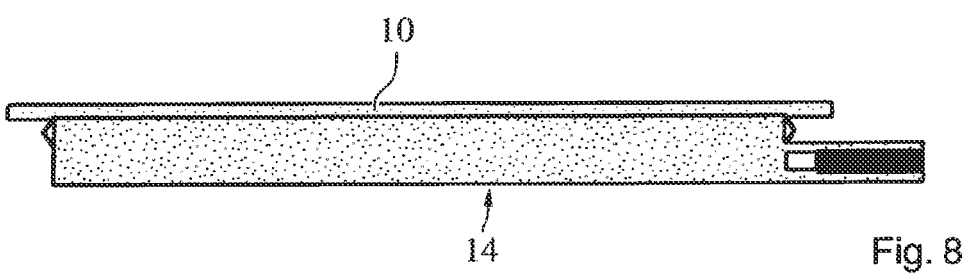

FIG. 8 shows a variant of the lighting device B in which the decoupling of light is implemented by means of a plurality or a multiplicity of scatter centers or microscatter centers, wherein the microscatter centers are provided so as to be distributed particularly over the entire volume of the light guiding element 1. In this case, the light guiding element 1 is provided particularly as a transparent light guide.

Figure 9:
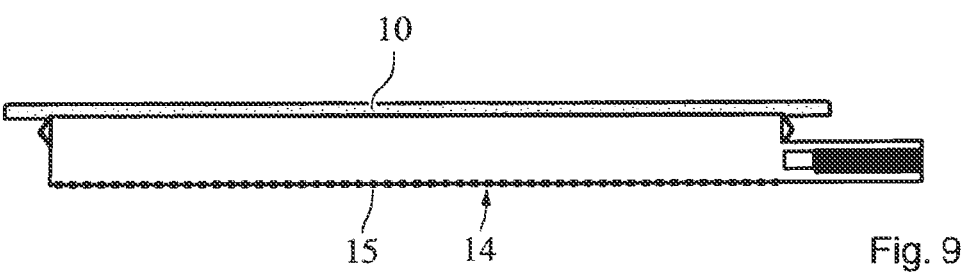

FIG. 9 shows a variant of the lighting device B in which the decoupling of light (particularly on the back or on the second lower face 14) is produced by means of rough patterning 15 of the second lower face 14 or of the light guiding element 1 in the region of the second lower face 14. In this case, the light guiding element 1 is designed particularly as a reflector with a diffuser or a diffusing panel in the region of the exit face 10.

Figure 10:
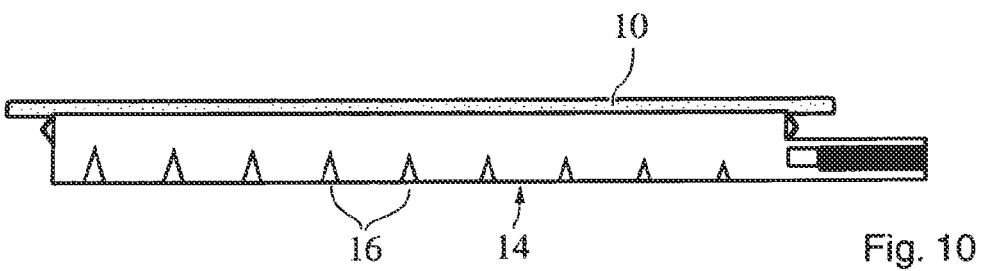

FIG. 10 shows a variant of the lighting device B in which the decoupling of light (particularly on the back or on the second lower face 14) is produced by means of a geometric structure 16 of the light guiding element 1 in the region of the second lower face 14, particularly in the form of prisms. In this case, the light guiding element 1 is designed particularly as a reflector with a diffuser or a diffusing panel in the region of the exit face 10.

The lighting device B according to the invention can, in principle, be used for all manner of lighting purposes instead of conventional universal lamps.

The text below presents a small selection of possible opportunities for use of the lighting device according to the invention.

Motor vehicle interior:
Lighting devices according to the invention which are arranged in the region of the roof liner can be used for the following purposes: makeup mirror lighting, entrance lamp, illumination of the rear region, particularly in the case of vehicles of "van" type.

Lighting devices according to the invention which are arranged in the region of a motor vehicle door can be used for the following purposes: puddle light, warning lamp, map case illumination.

Lighting devices according to the invention which are arranged in the region of a motor vehicle seat can be used for the following purposes: footwell illumination, reading light.

Lighting devices according to the invention which are arranged in the region of a motor vehicle dashboard can be used for the following purposes: glove compartment illumination, storage space illumination, footwell illumination.

Motor vehicle exterior:
Lighting devices according to the invention can be used for the following purposes: license plate lighting, direction of travel indicator, warning lamps, reversing lamps.

LIST OF REFERENCE SYMBOLS

1 Light guiding element/plastic carrier
2 Light source/LED light-emitting diode
2' Light entry face
3 Connecting element/connecting clips
4 Electrical connection means/integrated connector
5 Rib structure
10 Light exit face/exit face
11 Angular face
12 Step face
14 Second lower face
15 Rough patterning
16 Geometric structure
20 First upper face of the light source
21 First lower face of the light source
22, 22' Lateral faces of the light source
B Lighting device
30 Interior component

The invention claimed is:

1. A lighting device comprising a light guiding element and a light source configured to mount in or on a motor vehicle;
wherein the light guiding element has a light entry face, the light guiding element has a light exit face, a depth of the lighting device perpendicular to the light exit face corresponds essentially fully to the depth of the light guiding element, the light guiding element is a light guiding body, the lighting device comprises a back face and lateral faces averted from the light exit face, and the lighting device comprises an electrical connector in the region of the lateral faces; and
wherein a plurality of scatter centers, a plurality of microscatter centers, or a combination thereof, are distributed over an entire volume of the light guiding element.

2. The lighting device as claimed in claim 1, wherein, the depth of the lighting device perpendicular to the light exit face is less than 10 mm.

3. The lighting device as claimed in claim 1, wherein the light entry face is provided essentially perpendicular to the light exit face.

4. The lighting device as claimed in claim 1, wherein the light guiding element has a connecting element configured to mount the lighting device.

5. The lighting device as claimed in claim 1, wherein the depth of the lighting device perpendicular to the light exit face is less than 8 mm.

6. The lighting device as claimed in claim 1, wherein the depth of the lighting device perpendicular to the light exit face is less than 5 mm.

7. The lighting device as claimed in claim 1,
wherein the back face, a region of the light guiding element proximate to the back face, or a combination thereof, comprises a rough patterning configured to decouple light received from the light source.

8. The lighting device as claimed in claim 7, wherein the depth of the lighting device perpendicular to the light exit face is less than 10 mm.

9. The lighting device as claimed in claim 7, wherein the depth of the lighting device perpendicular to the light exit face is less than 8 mm.

10. The lighting device as claimed in claim 7, wherein the depth of the lighting device perpendicular to the light exit face is less than 5 mm.

11. The lighting device as claimed in claim 7, wherein the light entry face is provided essentially perpendicular to the light exit face.

12. The lighting device as claimed in claim 7, wherein the light guiding element has a connecting element configured to mount the lighting device.

13. The lighting device as claimed in claim 1,
wherein the light guiding element comprises geometric structures proximate to the back face and configured to decouple light received from the light source, and the geometric structures comprise a plurality of prisms.

14. The lighting device as claimed in claim 13, wherein the depth of the lighting device perpendicular to the light exit face is less than 10 mm.

15. The lighting device as claimed in claim 13, wherein the depth of the lighting device perpendicular to the light exit face is less than 8 mm.

16. The lighting device as claimed in claim 13, wherein the depth of the lighting device perpendicular to the light exit face is less than 5 mm.

17. The lighting device as claimed in claim 13, wherein the light entry face is provided essentially perpendicular to the light exit face.

18. The lighting device as claimed in claim 13, wherein the light guiding element has a connecting element configured to mount the lighting device.

* * * * *